United States Patent
Shang et al.

(10) Patent No.: US 11,366,924 B2
(45) Date of Patent: Jun. 21, 2022

(54) BLOCK CHAIN-BASED DATA QUERY METHOD, SERVER AND STORAGE MEDIUM

(71) Applicant: TENCENT TECHNOLOGY (SHENZHEN) COMPANY LIMITED, Guangdong (CN)

(72) Inventors: Zhi Hao Shang, Shenzhen (CN); Hong Fei Zhou, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 239 days.

(21) Appl. No.: 16/907,580

(22) Filed: Jun. 22, 2020

(65) Prior Publication Data
US 2020/0320217 A1 Oct. 8, 2020

Related U.S. Application Data

(63) Continuation of application No. PCT/CN2019/079636, filed on Mar. 26, 2019.

(30) Foreign Application Priority Data

Apr. 27, 2018 (CN) .......................... 201810393489.1

(51) Int. Cl.
*G06F 21/00* (2013.01)
*G06F 21/62* (2013.01)
(Continued)

(52) U.S. Cl.
CPC ...... *G06F 21/6227* (2013.01); *G06F 16/2264* (2019.01); *G06F 16/2282* (2019.01); *G06F 21/602* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 2019/0089701 A1* | 3/2019 | Mercury | G06F 30/20 |
| 2020/0322800 A1* | 10/2020 | Ozanian | G06N 3/04 |
| 2021/0390196 A1* | 12/2021 | Lavine | G06F 21/6209 |

FOREIGN PATENT DOCUMENTS

| | | |
|---|---|---|
| CN | 106354994 A | 1/2017 |
| CN | 107451275 A | 12/2017 |

(Continued)

OTHER PUBLICATIONS

International Search Report for PCT/CN2019/079636 dated Jun. 27, 2019 [PC/ISA/210].

(Continued)

*Primary Examiner* — Andrew J Steinle
(74) *Attorney, Agent, or Firm* — Sughrue Mion, PLLC (57) ABSTRACT

A block chain-based data query method, performed by a server of a block chain system, is provided. In the method, a data identifier of first data to be queried is obtained according to a query request, the query request including a user identifier of a user that initiates the query request. Data permission information in a target block in a target block chain of the block chain system is obtained according to the data identifier. Based on the data permission information not including the user identifier, a query permission request is transmitted to at least one target server in the block chain system, the query permission request including the user identifier and the data identifier. Based on a received query permission response satisfying a target policy in the data permission information, the first data is obtained from a data storage system according to the data identifier.

20 Claims, 4 Drawing Sheets

(51) Int. Cl.
    *G06F 16/22*     (2019.01)
    *G06F 21/60*     (2013.01)
    *H04L 9/30*     (2006.01)

(56) References Cited

FOREIGN PATENT DOCUMENTS

| | | |
|---|---|---|
| CN | 107592318 A | 1/2018 |
| CN | 107767926 A | 3/2018 |
| CN | 108563788 A | 9/2018 |

OTHER PUBLICATIONS

Written Opinion for PCT/CN2019/079636 dated Jun. 27, 2019 [PC/ISA/237].

\* cited by examiner

BLOCK CHAIN-BASED DATA QUERY METHOD, SERVER AND STORAGE MEDIUM

CROSS-REFERENCE TO THE RELATED APPLICATION(S)

This application is a bypass continuation application of International Application No. PCT/CN2019/079636, filed on Mar. 26, 2019, which claims priority to Chinese Patent Application No. 201810393489.1, entitled "BLOCK CHAIN-BASED DATA QUERY METHOD, APPARATUS, SERVER, AND STORAGE MEDIUM" filed on Apr. 27, 2018, of which disclosures are herein incorporated by reference in their entireties.

FIELD

The example embodiments of the disclosure relate to the field of network technologies, and in particular, to a block chain-based data query method, a server, and a storage medium.

BACKGROUND

With the development of network technologies, Internet may provide more services, and an amount of data produced by various services increases rapidly. In addition, in a service processing process, storage of service data and query based on the storage are involved. However, in a data query process, data is transmitted between devices, and consequently, data may be tampered with, leaked, or stolen, and data security may be compromised. Therefore, there is a great need for a method of querying data safely and efficiently.

A data query method in the related art is performed based on a permission of a user account. When a data query request of any user is received, whether the user can query service data is determined according to a permission corresponding to an account of the user, and when it is determined that the user has a query permission, the requested service data is returned. According to the data query method in the related art, the data query is performed according to the permission of the user account. As a result, data security cannot be ensured and flexibility is poor.

SUMMARY

Example embodiments of the disclosure provide a block chain-based data query method, a server, and a storage medium, that solve problems of low data security and poor flexibility.

According to an aspect of an example embodiment, provided is a block chain-based data query method, performed by a server of a block chain system, including: obtaining a data identifier of first data to be queried according to a query request, the query request including a user identifier of a user that initiates the query request; obtaining data permission information in a target block in a target block chain of the block chain system according to the data identifier; based on the data permission information not including the user identifier, transmitting a query permission request to at least one target server in the block chain system, the query permission request including the user identifier and the data identifier; and based on a received query permission response satisfying a target policy in the data permission information, obtaining the first data from a data storage system according to the data identifier.

According to an aspect of an example embodiment, provided is a server of a block chain system, including: at least one memory configured to store program code; and at least one processor configured to read the program code and operate as instructed by the program code, the program code including: obtaining code configured to cause at least one of the at least one processor to obtain a data identifier of first data to be queried according to a query request, the query request including a user identifier of a user that initiates the query request; obtaining code configured to cause at least one of the at least one processor to obtain data permission information in a target block in a target block chain of the block chain system according to the data identifier; transmitting code configured to cause at least one of the at least one processor to, based on the data permission information not including the user identifier, transmit a query permission request to at least one target server in the block chain system; and obtaining code configured to cause at least one of the at least one processor to, based on a received query permission response satisfying a target policy in the data permission information, obtain the first data from a data storage system according to the data identifier.

According to an aspect of an example embodiment, provided is a non-transitory computer-readable storage medium, storing at least one instruction executable by at least one processor to perform: obtaining a data identifier of first data to be queried according to a query request, the query request including a user identifier of a user that initiates the query request; obtaining data permission information in a target block in a target block chain of a block chain system according to the data identifier; based on the data permission information not including the user identifier, transmitting a query permission request to at least one target server in the block chain system, the query permission request including the user identifier and the data identifier; and based on a received query permission response satisfying a target policy in the data permission information, obtaining the first data from a data storage system according to the data identifier.

According to an aspect of an example embodiment, provided is a server including a processor and a memory, the memory storing at least one instruction, and the instruction being loaded and executed by the processor to implement operations performed in the foregoing block chain-based data query method.

According to an aspect of an example embodiment, provided is a computer-readable storage medium storing at least one instruction, the at least one instruction being loaded and executed by a processor to implement operations performed in the foregoing block chain-based data query method.

The technical solutions provided in the embodiments of the disclosure have the following beneficial effects:

When a request of querying data by a user is obtained, a permission of querying the data by the user is determined based on data permission information. When it is determined that the user is an owner of the data, query permission responses of a plurality of servers may be obtained according to a consensus policy in the data permission information, and when the obtained query permission responses meet the consensus policy, the data is obtained from a data storage system. In the method, the data permission information is set to improve security and privacy of data, and different consensus policies may be set for different data, to improve flexibility of setting a data query permission, so that a data query process may be more secure and more intelligent.

BRIEF DESCRIPTION OF THE DRAWINGS

To describe the technical solutions of the example embodiments of the disclosure more clearly, the following briefly describes the accompanying drawings for describing the example embodiments. Apparently, the accompanying drawings in the following description show only some example embodiments of the disclosure, and all other embodiments obtained by a person of ordinary skill in the art based on the embodiments of the disclosure described herein without creative efforts shall fall within the protection scope of the disclosure.

DETAILED DESCRIPTION

To make the objectives, technical solutions, and advantages of the disclosure clearer, the following further describes implementations of the disclosure in detail with reference to the accompanying drawings.

Some terms that appear in the following specific description processes are described below:

An intelligent contract, which is a contract program executed automatically according to a specific condition, is an important channel through which a user interacts with a block chain and implements a service logic by using the block chain. For example, each organization may access a data storage system by using an intelligent contract on a block chain deployed in a server, to use functions such as data storage and data query provided by the data storage system.

A target policy may be one of consensus polices, for example, an endorsement policy that may be used for indicating a necessary condition for an endorsement process in a data storage system. For example, the endorsement policy may instruct a plurality of endorsement nodes that need to perform endorsement to form an endorsement node set. An endorsement process requires joint signatures of the endorsement node set.

Figure 1:
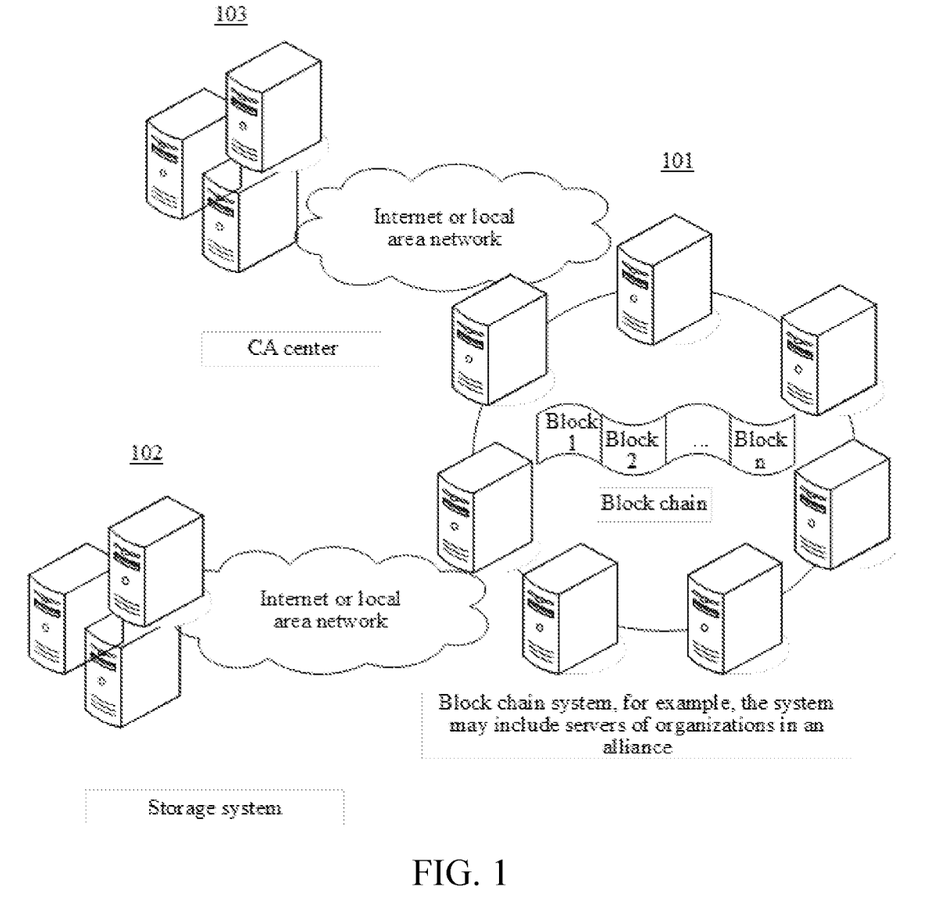
FIG. 1 is a schematic structural diagram of a data storage system according to an example embodiment of the disclosure.

FIG. 1 is a schematic structural diagram of a data storage system according to an embodiment of the disclosure. The system includes a plurality of servers 101 and a plurality of storage devices 102.

The plurality of servers 101 may be configured with the same block chain or a plurality of block chains, that is, the plurality of servers 101 may form a block chain system, and each server 101 is a node in the block chain system. The plurality of servers 101 may be a plurality of servers of the same organization, or may be a plurality of servers belonging to different organizations. For example, the block chain system may include servers of departments of a hospital, and the block chain system may alternatively include a server of an insurance organization, a server of a bank, and the like. A user of each organization may access a server of the organization by using a terminal 1011, and a plurality of terminals 1011 may be electronic devices that may access the plurality of servers 101. The electronic device may be a computer, a smartphone, a tablet computer, or another electronic device.

To perform services such as security verification and permission management, a block chain system may be configured with a certificate authority (CA) center 103, configured to store secret keys of organizations. Servers in the block chain system may obtain the secret keys of the organizations from the CA center 103 to perform processes such as data encryption and data decryption. The plurality of storage devices 102 are configured to provide a storage service for the plurality of servers 101. The plurality of servers 101 may form a distributed storage system, configured to provide stored data in a distributed form. Each server 101 may alternatively be provided with a private block chain to provide a data storage service.

Figure 2:
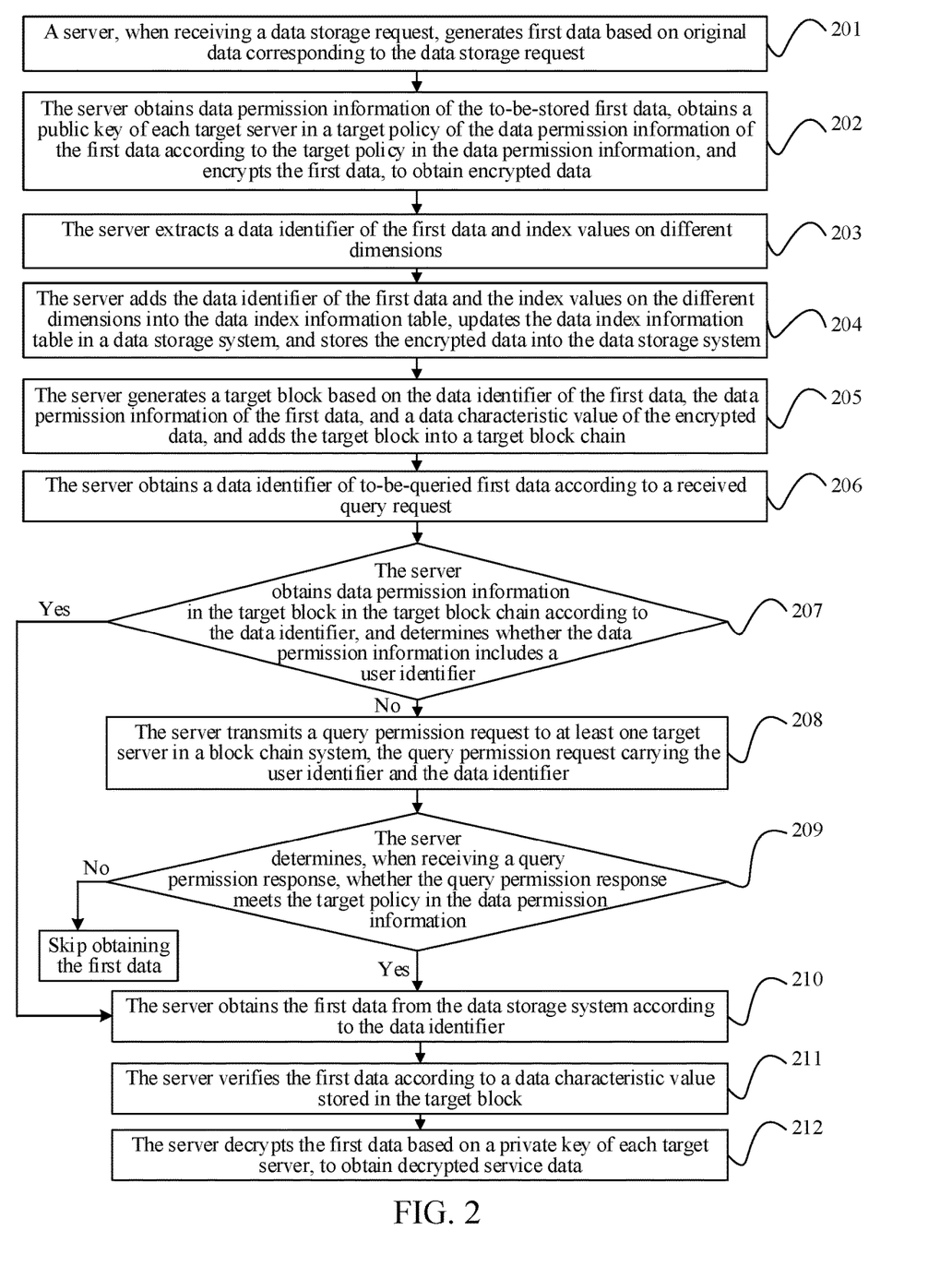
FIG. 2 is a flowchart of a block chain-based data query method according to an example embodiment of the disclosure.

Based on an implementation environment provided in FIG. 1, when a terminal has a data storage requirement, data may be stored in a storage device in a distributed storage system by using a storage mechanism provided by a block chain system, to facilitate subsequent query. A storage process and a query process are described below. FIG. 2 is a flowchart of a block chain-based data query method according to an embodiment of the disclosure, and an execution body of the method may be a server in a block chain system. Referring to FIG. 2, the method may include the following operations 201-212:

Operation 201. A server, when receiving a data storage request, generates first data based on original data corresponding to the data storage request, a data length of the first data being a preset data length, and a dimension of the first data corresponding to a data dimension in a data index information table.

The original data may be data that needs to be stored. The original data may be carried by the data storage request, or may be any data pre-stored on the server. For example, a user may input data on a terminal of a server side, and when the input is completed, a data storage request may be triggered through submission.

When the server needs to store data, to facilitate subsequent storage and query, the original data corresponding to the data storage request may be normalized. The normalization includes two parts: the first part is to normalize dimensions of the original data, and the second part is to normalize a data length. Specifically, operation 201 may include the following operation 1 to operation 3:

Operation 1. Convert data information of the original data on each dimension into a corresponding index value, to obtain index values of different dimensions of the original data.

The original data may include information on a plurality of different dimensions. Therefore, to unify expression of data, data information of the original data on different dimensions may be converted into index values, indicating data information expressed on the different dimensions. For example, for a patient profile as the original data, dimensions of the patient profile may include a gender dimension and a department dimension. The gender dimension includes male and female, and the department dimension includes a medical department, a surgical department, an ophthalmology department, and the like.

During conversion, index values of the dimensions into which the original data is specifically converted may be determined based on a data index information table corresponding to the original data, and different types of original data may correspond to different data index information tables. For example, a patient profile of a hospital may correspond to a data index information table of the hospital. Correspondingly, the patient profile of the hospital may be converted according to a plurality of dimensions defined by the data index information table of the hospital. When a dimension into which the original data is to be converted is determined, the data index information table may be determined according to data basic information of the original data. Different data basic information may be used for indicating an organization to which the original data belongs, and may correspond to data index information tables of different organizations.

The data index information table is used as an example, and the data index information table includes a data identifier of stored data and index values on different dimensions. The different dimensions are used for indicating different categories of data, and the index values on the dimensions are used for indicating a range included in the dimensions. Optionally, the data index information table may be stored in a data storage system in a bitmap format. When first data belongs to data indicated by an index value on a dimension in the data index information table, the index value may be recorded as 1 in a cell of a dimension corresponding to an identifier of the first data, and when the first data does not belong to data indicated by an index value on a dimension in the data index information table, the index value may be recorded as 0 in a cell of a dimension corresponding to the identifier of the first data. This is not specifically limited in this embodiment of the disclosure.

For example, when the data index information table of the first data is an index information table of patient profile data in a hospital, the dimension may be a gender dimension, a department dimension, or the like. An index value of the gender dimension may be male and female, and an index value in the department dimension may be a medical department, a surgical department, an ophthalmology department, or the like. This is not specifically limited in this embodiment of the disclosure. Data identifiers of the patient profile may be X1, X2, X3, X4, X5, X6, . . . , Xn, and the like, and a data index information table in a distributed storage system may be shown in Table 1:

TABLE 1

|  |  | X1 | X2 | X3 | X4 | X5 | X6 | X7 | ... | Xn |
|---|---|---|---|---|---|---|---|---|---|---|
| Gender dimension | Male | 1 | 0 | 0 | 1 | 0 | 0 | 1 | ... | 0 |
|  | Female | 0 | 1 | 1 | 0 | 1 | 1 | 0 | ... | 1 |
| Department dimension | Medical department | 0 | 0 | 0 | 0 | 0 | 1 | 0 | ... | 0 |
|  | Surgical department | 1 | 0 | 0 | 0 | 1 | 0 | 0 | ... | 0 |
|  | Ophthalmology department | 1 | 0 | 1 | 1 | 0 | 0 | 0 | ... | 0 |

In an example embodiment, specific index values of the dimensions defined in the data index information table may be provided through enumeration, that is, all possible index values on a dimension are provided. If data is not within an enumeration range, a management user may be prompted to modify the data.

For any dimension, index values on the dimension may be determined based on a type of the dimension, so that original data is converted based on a correspondence between data information on dimensions and index values on the dimensions. The dimension may belong to a binary type or an enumeration type. For example, the gender dimension may include male and female. For a dimension of the binary type, the dimension may be converted into a standard value represented by 0 or 1. For a dimension of the enumeration type, data information of the dimension may be represented by using more bytes. For example, for the department dimension, a byte count may be determined based on a total quantity of departments. When the total quantity of the departments is 8, as an example, three bytes may be used for expressing any one of eight departments. For example, '000' represents a medical department, '001' represents a surgical department, and '010' represents an ophthalmology department. Examples are not provided herein one by one.

Operation 2. Pad preset data on the original data in a case that a data length of the original data is less than a preset data length. If the data length of the original data is equal to the preset data length, operation 3 may be directly performed without padding.

Through the padding, the data length of the original data may all be the preset data length, thereby ensuring consistency of the data length. In addition, all data is converted into data with the same data length, so that the data has a specific rule during storage. An offset location of the data during storage may be determined according to the data length and a quantity of pieces of interval data, thereby greatly improving query efficiency.

Because a length of the original data may be shorter than the preset data length, a shortage may be padded by using the preset data, so that the length of the data remains consistent. When updating operations such as modification, deletion, and replacement are performed, a continuous address space may be directly modified. The preset data may be a section of preset values, for example, a plurality of consecutive numbers of 0.

Operation 3. Generate the first data based on the index values of the different dimensions of the original data and the data obtained padding.

In operation 3, the first data may be formed by the index values and the data obtained by padding, and may be a numerical string or a character string of a preset data length.

Operation 202. The server obtains data permission information of the to-be-stored first data, obtains a public key of each target server in a target policy of the data permission information of the first data according to the target policy in the data permission information, and encrypts the first data, to obtain encrypted data.

In this embodiment of the disclosure, data permission information of the first data may be further set during storage of the first data, the setting may be a process in which the server obtains data permission information corresponding to the first data, or the data permission information may be set by a client user to be stored according to self-requirements. The data permission information may be information of a user that is set for the first data by the client user and that is allowed to query the first data. The data permission information may alternatively be obtained automatically according to a data attribute. For example, a patient profile of a hospital is used as an example as the first data, and when the patient profile needs to be stored, the data permission information may be set such that the patient profile is to be viewable only by the patient and departments. When a payment record of a user is used as an example of the first data, the data permission information may be set such that the payment record is to be viewable only by the user, departments, and an organization to which a payment account belongs.

The process of automatically obtaining the data permission information may include: determining an attribute of the original data based on data basic information of the original data, and querying a preset data permission correspondence according to the attribute, to obtain data permission information corresponding to data obtained by converting the original data.

For example, a patient profile of a hospital is used as an example as the first data, and when the patient profile needs to be stored, and it is determined, based on the data basic information of the original data, that an attribute of the original data is the patient profile, a preset data permission correspondence is queried according to the patient profile attribute, to obtain data permission information corresponding to the patient profile, and the data permission information corresponding to the patient profile indicates that the patient profile is viewable only by the patient and departments.

A payment record of a user is used as an example of the first data, and when the payment record needs to be stored, and it is determined, based on the data basic information of the original data, that an attribute of the original data is the payment record, a preset data permission correspondence is queried according to the payment record attribute, to obtain data permission information corresponding to the payment record, and the payment record is viewable only by the user, departments, and an organization to which a payment account belongs.

Further, the data permission information of the first data may include a data identifier of the first data, a corresponding user identifier that has a permission to directly view the first data, a target policy of the first data, and the like. The target policy includes at least a plurality of target servers for performing consensus on the first data, a consensus success condition, and the like. For example, when first data stored in a server in a hospital is a patient profile, the patient and an attending doctor of the patient may be set to have a permission to query the patient profile. A profile number of the patient profile is used as a data identifier of the first data, and data permission information of the patient profile may include the profile number, a user identifier of the patient, and a user identifier of the attending doctor of the patient. Optionally, a target policy may alternatively be stored in the data permission information of the patient profile. For example, when a user of a given user identifier that is not the user identifier of the patient or the user identifier of the attending doctor of the patient attempts to view the patient profile, the user of the given user identifier may view the patient profile when the user obtains permissions of a plurality of target servers.

Based on the foregoing content, in operation 202, after obtaining the data permission information, the server may obtain server identifiers of the target servers in the target policy in the data permission information, obtain the public keys of the target servers from a CA center based on the server identifiers of the target servers, and encrypt the first data, to obtain the encrypted data.

The process of encrypting based on a plurality of public keys may be performed based on a specific order, that is, multi-encryption is performed on the first data by using the plurality of public keys in sequence to obtain to-be-stored data. The encryption order may also be stored in the data permission information, so that in subsequent decryption, decryption is performed in a reverse order according to the encryption order.

Operation 203. The server extracts a data identifier of the first data and index values on different dimensions.

Operation 204. The server adds the data identifier of the first data and the index values on the different dimensions into the data index information table, updates the data index information table in a data storage system, and stores the encrypted data into the data storage system, the data index information table including a data identifier of stored data and index values on different dimensions.

Before encryption is performed, to facilitate subsequent query, the index values further need to be extracted and the data index information table further needs to be updated, so that the data storage system may query in real time according to actually stored data.

Operation 205. The server generates a target block based on the data identifier of the first data, the data permission information of the first data, and a data characteristic value of the encrypted data, and adds the target block into a target block chain.

Specifically, the target block may be generated and added into the target block chain by using a consensus mechanism in a block chain system, and interaction between a plurality of servers in the system may be involved. Details are not described in this embodiment of the disclosure.

Figure 3:
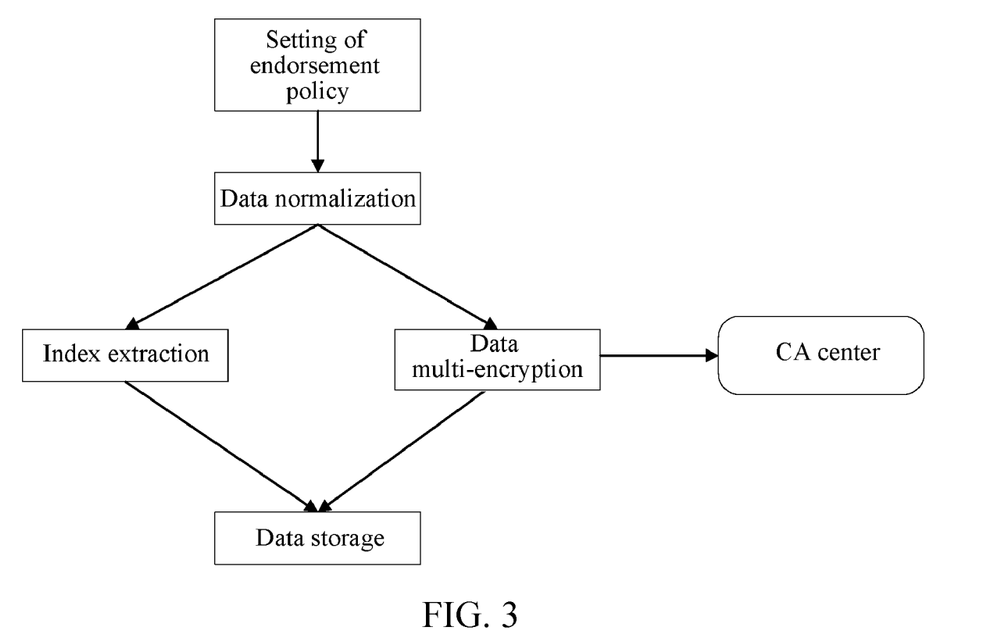
FIG. 3 is a schematic diagram of a data storage process according to an example embodiment of the disclosure.

The process of operation 201 to operation 205 may be summarized as a procedure shown in FIG. 3, that is, when data is stored, an endorsement policy may be first set and the data is normalized. Then, index extraction and multi-encryption of the data may be performed in parallel, and in the encryption process, interaction with a CA center is involved. Finally, the extracted index and the encrypted data are correspondingly stored in a data storage system, and in this process, updating of a data index information table is further involved. In the process, data is stored in the data storage system, and data including a storage record of the data is stored in a target block chain for use in query or other processes.

The foregoing operations 201 to 205 provide a procedure example of how to store data into the data storage system, while the following operations 206 to 212 provide a procedure example of how to query based on storage of data.

Operation 206. The server obtains a data identifier of to-be-queried first data according to a received query request, the query request carrying a user identifier of a user initiating the query request.

A user may trigger a query request by logging in to a server, for example, the user queries a patient profile of the user by using a profile number of the user as a login account. When the query request carries a data identifier, the data identifier is determined as a data identifier of to-be-queried first data. For example, a server in a block chain system of a hospital obtains a query request of querying a patient profile, and when the query request carries a profile number of the patient profile, the profile label is used as the data identifier of the to-be-queried first data.

Further, when the query request obtained by the server is a request of querying a specific type of data, a data identifier of the to-be-queried first data may be obtained according to a data index information table of first data in a data storage system. The specific method for obtaining the data identifier is shown in the following operations 206A and 206B.

Operation 206A. The server obtains query condition information in the query request, the query condition information including a target index value of at least one target dimension.

When a query request obtained by the server is query condition information, a dimension in the query condition information is determined as a target dimension, and an index value of the dimension in the query condition information is determined as a target index value. For example, the target dimension may be a male dimension, the target index value may be an index value of the male dimension, which is 1, and when the target dimension is a medical department dimension, the target index value may be an index value of the medical department dimension, which is 1. This is not specifically limited in this embodiment of the disclosure. The query condition information may include target index values of two or more dimensions. For example, the target dimension may be a male dimension and a medical department dimension, and the target index value may be an index value of the male dimension, which is 1, and an index value of the medical department dimension, which is 1.

Operation 206B. Query a data index information table in the data storage system according to the target index value of the at least one target dimension, to obtain the data identifier of the first data.

At least one first data identifier is obtained from the data index information table according to a target index value of one target dimension in a case that one target index value of the one target dimension is included in the query condition information, and an index value of a target dimension of each of the at least one first data identifier is equal to the target index value. For example, an index value of a target dimension in query condition information obtained by a server of a hospital is female, a list of which a dimension is a gender dimension and an index value is female is searched in the data index information table, and a data identifier corresponding to a cell recorded as 1 in the list is extracted. As shown in Table 2, when a target index value in the query condition information is female, obtained data identifiers of first data are X2, X3, X5, X6, and Xn.

TABLE 2

|  |  | X1 | X2 | X3 | X4 | X5 | X6 | X7 | ... | Xn |
|---|---|---|---|---|---|---|---|---|---|---|
| Gender dimension | Female | 0 | 1 | 1 | 0 | 1 | 1 | 0 | ... | 1 |

Further, at least one second data identifier is obtained from the data index information table according to target index values of at least two target dimensions in a case that at least two target index values of at least two target dimensions are included in the query condition information, and a product of index values of the at least two target dimensions of each of the at least one second data identifier is equal to a product of the at least two target index values. For example, when an index value of a target dimension in query condition information obtained by a server of a hospital is female and an ophthalmology department, a list of which a dimension is a gender dimension and an index value is female and a list of which an index value of a department dimension is an ophthalmology department are searched in a data index information table. When a product of numbers recorded in cells of the same column in the two lists is 1, a data identifier corresponding to the column is extracted. As shown in Table 3, when a target index value in query condition information is female and an ophthalmology department, an obtained second data identifier of the first data is X3.

TABLE 3

|  |  | X1 | X2 | X3 | X4 | X5 | X6 | X7 | ... | Xn |
|---|---|---|---|---|---|---|---|---|---|---|
| Gender dimension | Female | 0 | 1 | 1 | 0 | 1 | 1 | 0 | ... | 1 |
| Department dimension | Ophthalmology department | 1 | 0 | 1 | 1 | 0 | 0 | 0 | ... | 0 |

Operation 207. The server obtains data permission information in the target block in the target block chain according to the data identifier, and determines whether the data permission information includes the user identifier; if the data permission information includes the user identifier, operation 210 is performed, and if the data permission information does not include the user identifier, operation 208 is performed.

The target block is a block storing the data identifier in the target block chain. In this embodiment of the disclosure, when obtaining a query request inputted by a user, and determining the data identifier of the first data according to the query request, the server determines data permission information of the first data according to the data identifier in a target block of a target block chain configured in the server, and when the data permission information of the first data includes a user identifier carried by the query request, the server performs operation 210, that is, obtains the first data from a data storage system according to the user identifier. For example, when obtaining a query request of a user for a patient profile of a female in an ophthalmology department, and determining that a data identifier of the patient profile of the female in the ophthalmology department is X3 according to the query request, a server of a hospital may determine data permission information of the patient profile according to the data identifier X3 in a target block of a target block chain configured in the server, and the data permission information may include a user identifier of a chief of the ophthalmology department, a user identifier of an attending doctor of the patient, a user identifier of the patient, or the like. This is not specifically limited in this embodiment of the disclosure. When the user identifier carried in the query request obtained by the server is the user identifier of the chief of the ophthalmology department, the server may determine, according to the user identifier of the chief of the ophthalmology department and the data permission information of the patient profile, that the chief of the ophthalmology department has a permission to query the patient profile. In the foregoing example, a user identifier of a personal user is used for limiting the data permission information. In some embodiments, the data permission information may further include a server identifier, an organization identifier, or the like, to open a query permission of the data to a corresponding server or a corresponding organization. This is not specifically limited in this embodiment of the disclosure.

Further, when the data permission information of the first data does not include the user identifier carried in the query request, the server performs operation 208.

Operation 208. The server transmits a query permission request to at least one target server in a block chain system, the query permission request carrying the user identifier and the data identifier.

When determining that the data permission information of the first data does not include the user identifier carried in the query request, the server transmits a query permission request to at least one target server, and the at least one target server may be at least one node in the block chain system. Further, the at least one target server may be a target server limited by a target policy, to limit a consensus within several servers and reduce a quantity of signaling interactions in the block chain system.

Operation 209. The server determines, when receiving a query permission response, whether the query permission response meets the target policy in the data permission information; if the query permission response meets the target policy in the data permission information, the server continues to perform operation 210, and if the query permission response does not meet the target policy in the data permission information, the server stops obtaining the first data.

In this embodiment of the disclosure, when receiving a query permission response returned by the at least one target server, the server checks, according to a server identifier of the at least one target server carried in the query permission response, whether a server allowed to be queried satisfies a requirement of the target policy in the data permission information of the data. For example, when the target policy requires that query of the first data may be provided only when all target servers need to return a query permission response, the server may provide the first data for the current query process only when receiving the query permission responses of all the target servers. For another example, when the target policy requires that query of the first data may be provided when only several target servers return a query permission response, the server may provide the query of the first data when receiving the query permission responses of the several target servers.

An example embodiment is described for illustrative purposes. When a block chain system of a hospital includes m organizations, server identifiers of servers of the m organizations may be: U1, U2, U3, U4, . . . , Um, and a format of an endorsement success condition in the target policy may be AND (U1, U2, and U3). In this case, the target policy is used for indicating that when a server obtains query permission responses transmitted by three servers with the server identifiers of U1, U2, and U3, first data may be queried. Optionally, the endorsement success condition in the target policy may alternatively be AND (U1 OR (U2 and U3)). In this case, the target policy is used for indicating that when the server obtains a query permission response transmitted by any one or two servers of a server with the server identifier of U1 and a server with the server identifier of U2 or U3, first data may be returned for this query. This is not specifically limited in this embodiment of the disclosure.

When the query permission response received by the server does not meet the target policy in the data permission information, an operation of obtaining the first data is not performed. When the query permission response received by the server meets the target policy in the data permission information, the server continues to perform the following process of querying the first data.

Further, when determining that the first data cannot be obtained, the server may further display prompt information of no query permission, to notify a user that the user does not have a permission to query the data.

Operation 210. The server obtains the first data from the data storage system according to the data identifier.

In this embodiment of the disclosure, when the query permission response received by the server meets the target policy in the data permission information, the first data is obtained. A specific process of obtaining the first data includes the following operations 210A to 210C.

Operation 210A. The server determines a relative location between the data identifier and a first data identifier (or a second data identifier) in the data index information table.

When the server may query the first data, the server queries, in a data storage system according to a data identifier of the first data, a data index information table in which the data identifier of the first data is located, obtains a location of the data identifier in the data index information table and a location of the first data identifier in the data index information table, and determines the relative location between the two data identifiers according to the locations of the two data identifiers, that is, the quantity of data identifiers between the two data identifiers. As shown in Table 4 below, when the data identifier of the first data is X3, a location of X1 in Table 3 is obtained, to determine a relative location between X1 and X3.

TABLE 4

| | | X1 | X2 | X3 | X4 | X5 | X6 | X7 | ... | Xn |
|---|---|---|---|---|---|---|---|---|---|---|
| Gender dimension | Female | 0 | 1 | 1 | 0 | 1 | 1 | 0 | ... | 1 |
| Department dimension | Ophthalmology department | 1 | 0 | 1 | 1 | 0 | 0 | 0 | ... | 0 |

Operation 210B. The server determines an offset location of the first data in a first file according to the relative location and a preset data length, the first file being a file corresponding to the data index information table.

Operation 210C. The server obtains the first data from the data storage system according to a storage location of the first file in the data storage system and the offset location.

A location of a first data identifier in the data index information table is a storage starting location of the first file. After the relative location is determined, a difference between storage addresses of the first data and data corresponding to the first data identifier may be determined according to the relative location and the preset data length. The difference between the storage addresses is the offset location of the first data in the first file. Because the storage starting location of the first file is known, an actual storage location of the first data may be learned, and the data is obtained based on the actual storage location.

Such query based on the relative location may greatly improve a data obtaining speed, reduce complexity of a query process, and improve query efficiency.

Operation 211. The server verifies the first data according to a data characteristic value stored in the target block.

In this embodiment of the disclosure, when obtaining the first data from the data storage system, the server generates a characteristic value of the first data according to the obtained first data, and extracts, according to the data identifier of the first data, the data characteristic value stored in the target block in a target block chain. When the generated characteristic value is the same as the extracted characteristic value, verification on the first data succeeds, and if the generated characteristic value is different from the extracted characteristic value, the verification fails. Verification on the obtained first data according to the characteristic value may ensure that the obtained first data is not tampered with during storage and query. When the verification by the server on the first data succeeds, the server performs a subsequent decryption operation on data, and when the verification by the server on the first data fails, it indicates that the first data is tampered with, and the server does not continue to perform the subsequent decryption operation on the data.

Operation 212. The server decrypts the first data based on a private key of each server, to obtain decrypted service data.

In this embodiment of the disclosure, data stored in the data storage system is encrypted data. Therefore, after obtaining the first data, the server further needs to decrypt the first data. A specific decryption process is shown in the following operations 212A and 212B.

Operation 212A. Obtain the private key of each server in the target policy.

When determining that the first data is not tampered with, the server determines, according to the target policy in the data permission information, server identifiers of the plurality of servers for performing consensus on the data, and obtains the private key of each server from a CA center according to the server identifiers of the plurality of servers.

Operation 212B. Decrypt the first data based on the private keys of the plurality servers, and return the decrypted service data to the server.

When the private keys of the servers are obtained, an encryption order of the servers on the first data is determined according to the target policy. Then, according to the obtained private keys of the servers, the first data is decrypted according to a reverse order of the encryption order. When the decryption succeeds, the decrypted service data is returned.

In the process, the first data is data currently being queried. The data may alternatively be referred to as second data or other. This is not specifically limited in this embodiment of the disclosure.

Figure 4:
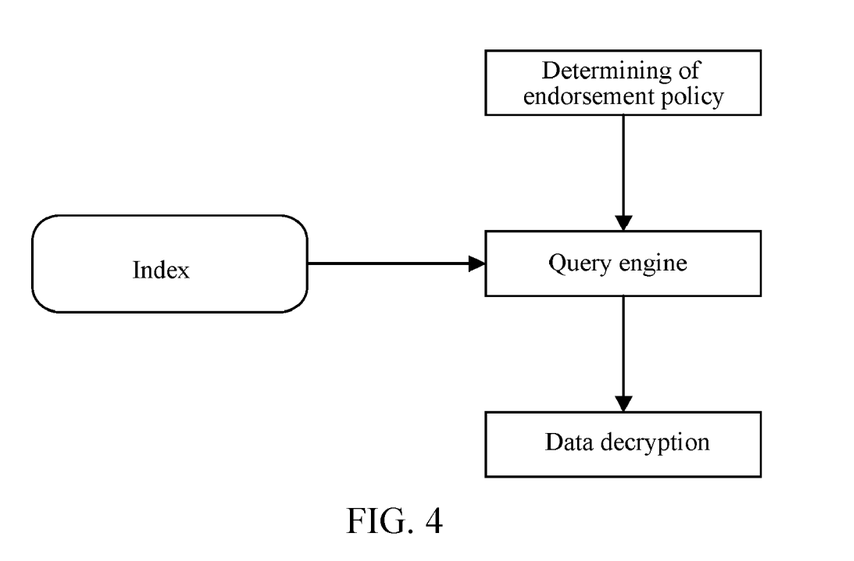
FIG. 4 is a schematic diagram of a data query process according to an example embodiment of the disclosure.

The specific query process may be summarized into a procedure shown in FIG. 4. When the target policy is determined based on the data permission information, it may be determined, based on the target policy, whether to perform the query. When it is determined to perform the query, the first data in the data storage system is queried by using a query engine based on an index of the query. Then, the data is decrypted by using a private key provided by a CA center, and then decrypted service data is returned, so that a query permission is controlled, and rapid query may be performed.

In the method provided by this embodiment of the disclosure, when a request of querying data by a user is obtained, a permission of querying the data by the user is determined based on data permission information. When it is determined that the user is an owner of the data, query permission responses of a plurality of servers may be obtained according to a consensus policy in the data permission information, and when the obtained query permission responses meet the consensus policy, the data is obtained from a data storage system. In the method, the data permission information is set to improve security and privacy of data, and different consensus policies may be set for different data, to improve flexibility of setting a data query permission, so that a data query process may be more secure and more intelligent.

Figure 5:
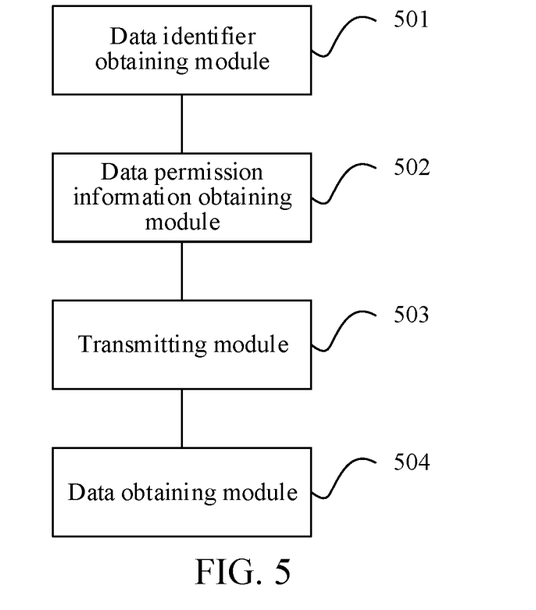
FIG. 5 is a schematic structural diagram of a block chain-based data query apparatus according to an example embodiment of the disclosure.

FIG. 5 is a schematic structural diagram of a block chain-based data query apparatus according to an embodiment of the disclosure. Referring to FIG. 5, the apparatus includes:

a data identifier obtaining module 501, configured to obtain a data identifier of to-be-queried first data according to a query request, the query request carrying a user identifier of a user initiating the query request;

a data permission information obtaining module 502, configured to obtain data permission information in a target block in a target block chain according to the data identifier;

a transmitting module 503, configured to transmit a query permission request to at least one target server in a block chain system in a case that the data permission information does not include the user identifier, the query permission request carrying the user identifier and the data identifier; and a data obtaining module 504, configured to obtain the first data from a data storage system according to the data identifier in a case that a received query permission response meets a target policy in the data permission information.

In a possible implementation of the disclosure, the data obtaining module 504 is further configured to obtain the first data from the data storage system according to the data identifier in a case that the data permission information includes the user identifier.

In a possible implementation of the disclosure, the data identifier obtaining module 501 is configured to:

obtain query condition information in the query request, the query condition information including a target index value of at least one target dimension;

query a data index information table in the data storage system according to the target index value of the at least one target dimension, to obtain the data identifier of the first data, the data index information table including a data identifier of stored data and index values on different dimensions.

In a possible implementation of the disclosure, the data identifier obtaining module 501 is configured to:

obtain at least one first data identifier from the data index information table according to a target index value of one target dimension in a case that there is one target index value of the at least one target dimension, an index value of a target dimension of each first data identifier being equal to the target index value; or obtain at least one second data identifier from the data index information table according to target index values of at least two target dimensions in a case that there are at least two target index values of the at least one target dimension, a product of index values of the at least two target dimensions of each second data identifier being equal to a product of the at least two target index values.

In a possible implementation of the disclosure, the data obtaining module 504 is configured to determine a relative location between the data identifier and a first data identifier (or a second data identifier) in the data index information table;

determine an offset location of the first data in a first file according to the relative location and a preset data length, the first file being a file corresponding to the data index information table; and obtain the first data from the data storage system according to a storage location of the first file in the data storage system and the offset location.

In a possible implementation of the disclosure, the apparatus further includes:

a verification module, configured to verify the first data according to a data characteristic value stored in the target block; and perform a subsequent decryption operation on data in a case that the verification succeeds; or skip performing the subsequent decryption operation on the data in a case that the verification fails.

In a possible implementation of the disclosure, the apparatus further includes a decryption module, configured to:

obtain a private key of each target server in the target policy;

and decrypt the first data based on the private key of each target server, to return decrypted service data.

In a possible implementation of the disclosure, the decryption module is configured to decrypt, according to an encryption order of each target server in the target policy, the first data by using the private key of each target server one by one, to return the decrypted service data.

In a possible implementation of the disclosure, the apparatus further includes:

an obtaining module, configured to: receive a data storage request, and obtain data permission information of the to-be-stored first data;

an encryption module, configured to: obtain a public key of each target server in a target policy of the data permission information of the first data, and encrypt the first data, to obtain encrypted data;

an updating module, configured to: update a data index information table in a data storage system according to the first data, and store the encrypted data into the data storage system, the data index information table including a data identifier of stored data and index values on different dimensions; and a processing module, configured to: generate the target block based on the data identifier of the first data, the data permission information of the first data, and a data characteristic value of the encrypted data, and add the target block into a target block chain.

In a possible implementation of the disclosure, the updating module is configured to: extract the data identifier of the first data and the index values on the different dimensions, and add the data identifier of the first data and the index values on the different dimensions into the data index information table.

In a possible implementation of the disclosure, the apparatus further includes: a data normalization module, configured to generate the first data based on original data corresponding to the data storage request, a data length of the first data being a preset data length, and a dimension of the first data corresponding to a data dimension in a data index information table.

In a possible implementation of the disclosure, the data normalization module is configured to: convert data information of the original data on each dimension into a corresponding index value, to obtain index values of different dimensions of the original data, pad preset data after the original data in a case that a data length of the original data is less than the preset data length, and generate the first data based on the index values of the different dimensions of the original data and data obtained by padding.

According to the apparatus provided by this embodiment of the disclosure, when a request of querying data by a user is obtained, a permission of querying the data by the user is determined based on data permission information. When it is determined that the user is an owner of the data, query permission responses of a plurality of servers may be obtained according to a consensus policy in the data permission information, and when the obtained query permission responses meet the consensus policy, the data is obtained from a data storage system. In the method, the data permission information is set to improve security and privacy of data, and different consensus policies may be set for different data, to improve flexibility of setting a data query permission, so that a data query process may be more secure and more intelligent.

Any combination of the foregoing optional technical solutions may be used to form an optional embodiment of the disclosure. Details are not described herein.

Figure 6:
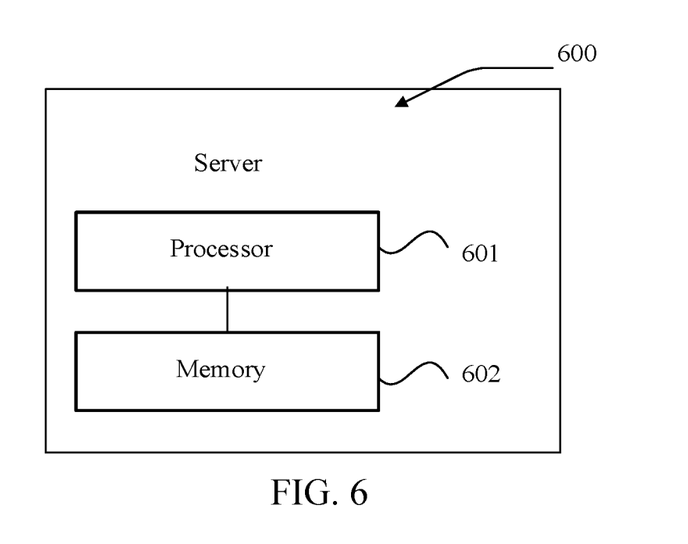
FIG. 6 is a schematic diagram of a server according to an example embodiment of the disclosure.

FIG. 6 is a schematic diagram of a server according to an embodiment of the disclosure. The server 600 may vary greatly due to different configurations or performance, and may include one or more processors (e.g., central processing units, CPU) 601 and one or more memories 602. The memory 602 stores at least one instruction, and the at least one instruction is loaded and executed by the processor 601 to implement the block chain-based data query method according to the foregoing method embodiments. The server may further include components such as a wired or wireless network interface, a keyboard, and an input/output interface, to facilitate inputs/outputs. The server may further include another component configured to implement functions of a device, and details are not described herein again.

In a possible implementation of the disclosure, the processor 601 is further configured to perform the following operation: obtaining the first data from the data storage system according to the data identifier in a case that the data permission information includes the user identifier.

In a possible implementation of the disclosure, the processor 601 is configured to perform the following operations: obtaining query condition information in the query request, the query condition information including a target index value of at least one target dimension, and querying a data index information table in the data storage system according to the target index value of the at least one target dimension, to obtain the data identifier of the first data, the data index information table including a data identifier of stored data and index values on different dimensions.

In a possible implementation of the disclosure, the processor 601 is configured to perform the following operations: obtaining at least one first data identifier from the data index information table according to a target index value of one target dimension in a case that there is one target index value of the at least one target dimension, an index value of a target dimension of each first data identifier being equal to the target index value; or obtaining at least one second data identifier from the data index information table according to target index values of at least two target dimensions in a case that there are at least two target index values of the at least one target dimension, a product of index values of the at least two target dimensions of each second data identifier being equal to a product of the at least two target index values.

In a possible implementation of the disclosure, the processor 601 is further configured to perform the following operations: determining a relative location between the data identifier and a first data identifier in the data index information table, determining an offset location of the first data in a first file according to the relative location and a preset data length, the first file being a file corresponding to the data index information table; and obtaining the first data from the data storage system according to a storage location of the first file in the data storage system and the offset location.

In a possible implementation of the disclosure, the processor 601 is further configured to perform the following operations: verifying the first data according to a data characteristic value stored in the target block, performing a subsequent decryption operation of data in a case that the verification succeeds; or skipping performing the subsequent decryption operation on the data in a case that the verification fails.

In a possible implementation of the disclosure, the processor 601 is further configured to perform the following operations: obtaining a private key of each target server in the target policy; and decrypt the first data based on the private key of each target server, to return decrypted service data.

In a possible implementation of the disclosure, the processor 601 is configured to perform the following operations: decrypting, according to an encryption order of each target server in the target policy, the first data by using the private key of each target server one by one, to return the decrypted service data.

In a possible implementation of the disclosure, the processor 601 is further configured to perform the following operations: receiving a data storage request, and obtaining data permission information of the to-be-stored first data; obtaining a public key of each target server in a target policy of the data permission information of the first data, and encrypting the first data, to obtain encrypted data; updating a data index information table in a data storage system according to the first data, and storing the encrypted data into the data storage system, the data index information table including a data identifier of stored data and index values on different dimensions; and generating the target block based on the data identifier of the first data, the data permission information of the first data, and a data characteristic value of the encrypted data, and adding the target block into a target block chain.

In a possible implementation of the disclosure, the processor 601 is configured to perform the following operations: extracting the data identifier of the first data and the index values on the different dimensions; and adding the data identifier of the first data and the index values on the different dimensions into the data index information table.

In a possible implementation of the disclosure, the processor 601 is further configured to perform the following operations: generating the first data based on original data corresponding to the data storage request, a data length of the first data being a preset data length, and a dimension of the first data corresponding to a data dimension in the data index information table.

In a possible implementation of the disclosure, the processor 601 is configured to perform the following operations: converting data information of the original data on each dimension into a corresponding index value, to obtain index values of different dimensions of the original data; padding preset data after the original data in a case that a data length of the original data is less than the preset data length; and generating the first data based on the index values of the different dimensions of the original data and data obtained by padding.

In an example embodiment, a computer-readable storage medium, for example, a memory including an instruction, is further provided. The instruction may be executed by a processor in a terminal, to complete the block chain-based data query method in the foregoing embodiments. For example, the computer-readable storage medium may be a ROM, a random access memory (RAM), a CD-ROM, a magnetic tape, a floppy disk, or an optical data storage device.

Operations and modules in the procedures and the structural diagrams described above may not be all necessary, and some operations or modules may be omitted depending on embodiments. An execution sequence of the operations is not fixed and may be adjusted as needed. Division of the modules is merely functional division for ease of descriptions. In an actual implementation of an example embodiment of the disclosure, one module may include a plurality of modules, and functions of a plurality of modules may be implemented by a same module. These modules may be located in a same device or in different devices.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

A person of ordinary skill in the art may understand that all or some of operations of the embodiments may be implemented by hardware or a program instructing related hardware. The program may be stored in a computer-readable storage medium. The storage medium may be a read-only memory, a magnetic disk or an optical disc.

The foregoing descriptions are merely example embodiments of the disclosure, but are not intended to limit the disclosure. Any modification, equivalent replacement, and improvement made without departing from the spirit and principle of the disclosure shall fall within the protection scope of the disclosure.

What is claimed is:

1. A block chain-based data query method, performed by a server of a block chain system, comprising:
   obtaining a data identifier of first data to be queried according to a query request, the query request including a user identifier of a user that initiates the query request;
   obtaining data permission information in a target block in a target block chain of the block chain system according to the data identifier;
   based on the data permission information not including the user identifier, transmitting a query permission request to at least one target server in the block chain system, the query permission request including the user identifier and the data identifier; and
   based on a received query permission response satisfying a target policy in the data permission information, obtaining the first data from a data storage system according to the data identifier.

2. The method according to claim 1, further comprising:
based on the data permission information including the user identifier, obtaining the first data from the data storage system according to the data identifier.

3. The method according to claim 1, wherein the obtaining the data identifier comprises:
obtaining query condition information in the query request, the query condition information comprising a target index value of at least one target dimension of the first data; and
querying a data index information table in the data storage system according to the target index value of the at least one target dimension, to obtain the data identifier of the first data, the data index information table comprising a data identifier of stored data and index values on different dimensions of the stored data.

4. The method according to claim 3, wherein the querying the data index information table comprises:
based on one target index value of one target dimension being included in the query condition information, obtaining at least one first data identifier from the data index information table according to the one target index value of the one target dimension, an index value of a target dimension of each of the at least one first data identifier being equal to the target index value; or
based on at least two target index values of at least two target dimensions being included in the query condition information, obtaining at least one second data identifier from the data index information table according to the at least two target index values of the at least two target dimensions, a product of index values of the at least two target dimensions of each of the at least one second data identifier being equal to a product of the at least two target index values.

5. The method according to claim 4, wherein the obtaining the first data comprises:
determining a relative location between the data identifier of the first data and a first data identifier or a second identifier in the data index information table;
determining an offset location of the first data in a first file according to the relative location and a preset data length, the first file being a file corresponding to the data index information table; and
obtaining the first data from the data storage system according to a storage location of the first file in the data storage system and the offset location.

6. The method according to claim 1, further comprising:
verifying the first data according to a data characteristic value stored in the target block; and
based on a result of the verifying being successful, performing a subsequent decryption operation on the first data.

7. The method according to claim 1, further comprising:
obtaining a private key of each of the at least one target server included in the target policy; and
decrypting the first data based on the private key of each of the at least one target server, to return decrypted service data.

8. The method according to claim 7, wherein the decrypting comprises:
decrypting, based on an encryption order of each of the at least one target server included in the target policy, the first data by sequentially using the private key of each of the at least one target server.

9. The method according to claim 1, further comprising:
receiving a data storage request, and obtaining data permission information of second data to be stored;
obtaining a public key of each target server included in a target policy of the data permission information of the second data, and encrypting the second data, to obtain encrypted data;
updating a data index information table in the data storage system according to the second data, and storing the encrypted data into the data storage system, the data index information table comprising a data identifier of stored data and index values on different dimensions of the stored data; and
generating a second target block based on a data identifier of the second data, the data permission information of the second data, and a data characteristic value of the encrypted data, and adding the second target block into the target block chain.

10. The method according to claim 9, wherein the updating the data index information table comprises:
extracting the data identifier of the second data and the index values on the different dimensions of the second data; and
adding the data identifier of the second data and the index values on the different dimensions of the second data into the data index information table.

11. The method according to claim 9, further comprising:
generating the second data based on original data corresponding to the data storage request, a data length of the second data being a preset data length, and a dimension of the second data corresponding to a data dimension in the data index information table.

12. The method according to claim 11, wherein the generating the second data comprises:
converting data information of the original data on each dimension into a corresponding index value, to obtain index values of different dimensions of the original data;
based on the data length of the original data being less than the preset data length, padding preset data on the original data; and
generating the second data based on the index values of the different dimensions of the original data and data obtained by the padding.

13. A server of a block chain system, comprising:
at least one memory configured to store program code; and
at least one processor configured to read the program code and operate as instructed by the program code, the program code comprising:
obtaining code configured to cause at least one of the at least one processor to obtain a data identifier of first data to be queried according to a query request, the query request including a user identifier of a user that initiates the query request;
obtaining code configured to cause at least one of the at least one processor to obtain data permission information in a target block in a target block chain of the block chain system according to the data identifier;
transmitting code configured to cause at least one of the at least one processor to, based on the data permission information not including the user identifier, transmit a query permission request to at least one target server in the block chain system; and
obtaining code configured to cause at least one of the at least one processor to, based on a received query permission response satisfying a target policy in the data permission information, obtain the first data from a data storage system according to the data identifier.

14. The server according to claim 13, wherein the program code further comprises obtaining code configured to cause at least one of the at least one processor to, based on the data permission information including the user identifier, obtain the first data from the data storage system according to the data identifier.

15. The server according to claim 13, wherein the program code further comprises:
code configured to cause at least one of the at least one processor to obtain query condition information in the query request, the query condition information comprising a target index value of at least one target dimension of the first data; and
code configured to cause at least one of the at least one processor to query a data index information table in the data storage system according to the target index value of the at least one target dimension, to obtain the data identifier of the first data, the data index information table comprising a data identifier of stored data and index values on different dimensions of the stored data.

16. The server according to claim 15, wherein the program code further comprises:
code configured to cause at least one of the at least one processor to, based on one target index value of one target dimension being included in the query condition information, obtain at least one first data identifier from the data index information table according to the one target index value of the one target dimension, an index value of a target dimension of each of the at least one first data identifier being equal to the target index value; or
code configured to cause at least one of the at least one processor to, based on at least two target index values of at least two target dimensions being included in the query condition information, obtain at least one second data identifier from the data index information table according to the at least two target index values of the at least two target dimensions, a product of index values of the at least two target dimensions of each of the at least one second data identifier being equal to a product of the at least two target index values.

17. The server according to claim 16, wherein the program code further comprises:
code configured to cause at least one of the at least one processor to determine a relative location between the data identifier of the first data and a first data identifier or a second data identifier in the data index information table;
code configured to cause at least one of the at least one processor to determine an offset location of the first data in a first file according to the relative location and a preset data length, the first file being a file corresponding to the data index information table; and
code configured to cause at least one of the at least one processor to obtain the first data from the data storage system according to a storage location of the first file in the data storage system and the offset location.

18. The server according to claim 13, wherein the program code further comprises:
code configured to cause at least one of the at least one processor to verify the first data according to a data characteristic value stored in the target block; and
code configured to cause at least one of the at least one processor to, based on a result of the verifying being successful, perform a subsequent decryption operation on the first data.

19. The server according to claim 13, wherein the program code further comprises:
code configured to cause at least one of the at least one processor to receive a data storage request, and obtain data permission information of second data to be stored;
code configured to cause at least one of the at least one processor to obtain a public key of each of the at least one target server included in a target policy of the data permission information of the second data, and encrypt the second data, to obtain encrypted data;
code configured to cause at least one of the at least one processor to update a data index information table in the data storage system according to the second data, and store the encrypted data into the data storage system, the data index information table comprising a data identifier of stored data and index values on different dimensions of the stored data; and
code configured to cause at least one of the at least one processor to generate a second target block based on a data identifier of the second data, the data permission information of the second data, and a data characteristic value of the encrypted data, and add the second target block into the target block chain.

20. A non-transitory computer-readable storage medium, storing at least one instruction executable by at least one processor to perform:
obtaining a data identifier of first data to be queried according to a query request, the query request including a user identifier of a user that initiates the query request;
obtaining data permission information in a target block in a target block chain of a block chain system according to the data identifier;
based on the data permission information not including the user identifier, transmitting a query permission request to at least one target server in the block chain system, the query permission request including the user identifier and the data identifier; and
based on a received query permission response satisfying a target policy in the data permission information, obtaining the first data from a data storage system according to the data identifier.

* * * * *